United States Patent [19]

Song et al.

[11] Patent Number: 5,321,498
[45] Date of Patent: Jun. 14, 1994

[54] PLANAR INTEGRATED CROSSOVER OPTICAL SYSTEM

[75] Inventors: Seok-Ho Song; El-Hang Lee; Kyong-Hon Kim, all of Daejeon, Rep. of Korea

[73] Assignee: Electronics & Telecommunications Research Institute, Daejeon, Rep. of Korea

[21] Appl. No.: 996,145

[22] Filed: Dec. 23, 1992

[30] Foreign Application Priority Data

Dec. 28, 1991 [KR] Rep. of Korea .................. 91-24778
Jun. 29, 1992 [KR] Rep. of Korea .................. 92-11455

[51] Int. Cl.$^5$ .............................................. G02B 6/12
[52] U.S. Cl. ........................................ 385/14; 385/11; 385/18
[58] Field of Search ................... 385/11, 14, 15, 16, 385/17, 18, 31, 36, 47

[56] References Cited

U.S. PATENT DOCUMENTS

| 4,297,464 | 7/1981 | Colombini | 385/14 |
| 4,468,084 | 8/1984 | Hutcheson et al. | 385/14 |
| 5,064,263 | 11/1991 | Stein | 385/14 |

FOREIGN PATENT DOCUMENTS

3-101716  4/1991  Japan .................. 385/17

*Primary Examiner*—John D. Lee
*Attorney, Agent, or Firm*—Antonelli, Terry, Stout & Kraus

[57] ABSTRACT

The present invention relates to planar integration of an optical system. The optical system is an integration of a crossover switching network having several optical elements such as mirrors, lenses, beam splitters etc., spatially separated on a single wafer using an acute-angle prism array disposed on the surface of a substrate in which the optical elements are integrated.

7 Claims, 7 Drawing Sheets

PLANAR INTEGRATED CROSSOVER OPTICAL SYSTEM

BACKGROUND OF THE INVENTION

1. Field of the Invention

The present invention relates to a planar integration of a free-space optical system, more particularly, to a method of integrating a crossover switching network having several optical elements such as mirrors, lenses, beam splitters etc. spatially on a single wafer with an acute angle prism array.

2. Background Art

Figure 1A:
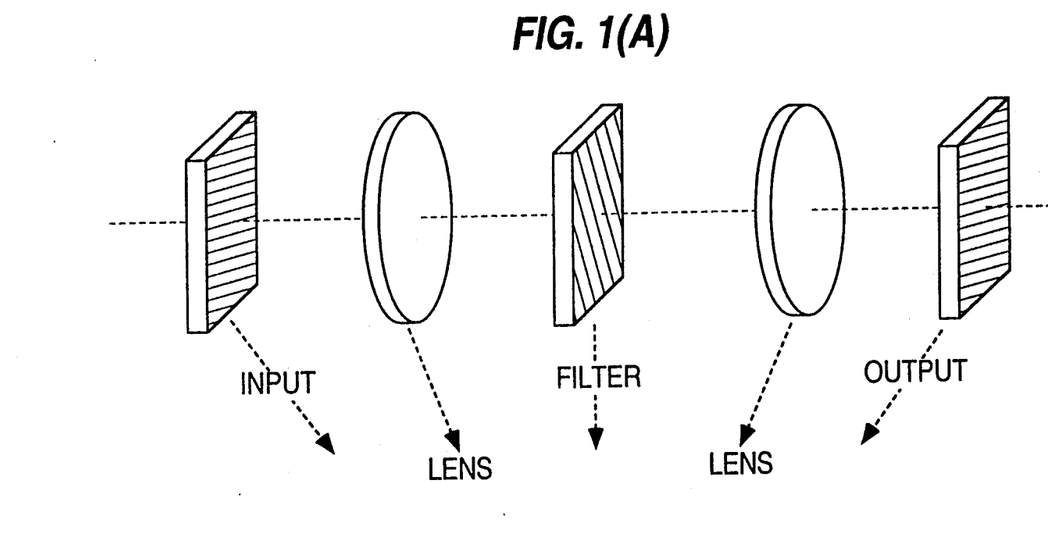
FIG. 1A is a view of a free-space optical system and FIG. 1B is a planar integrated optical system.

In a conventional crossover network of an optical system, individual optical parts such as mirrors, lenses, beam splitters and prisms are spaced apart, as shown in FIG. 1(A). According to such an arrangement of the optical parts, the size of the optical system is be increased due to the spatial arrangement of the parts.

Furthermore, it is difficult to manufacture the optical parts in such as optical system with an alignment accuracy of equal to less than 1 $\mu$m.

Also, once the optical system has been constructed, it is difficult to keep the system with the foregoing alignment.

An optical crossover interconnection capable of being used practically in a switching network requires a small sized optical system having an alignment accuracy of equal to or less than 1 $\mu$m.

DISCLOSURE OF INVENTION

Accordingly, a principle object of the invention is to provide a crossover planar integrated optical system having high accuracy on a wafer using a planar integration technique including lithography.

Another object of the present invention is to provide an optical system which reduces a light signal transfer path difference between a bypass and a crossover connection in the system.

To achieve the above objects, according to an aspect of the present invention, an acute angle prism array having a vertical angle of 70.52 degrees is formed on a substrate such as glass substrate, a silicon substrate or a GaAs substrate by using an ion beam etching process and a crossover optical network is constructed by using the acute angle prism array.

The acute prisms of the array reflect the beam incident on the etched substrate toward a planar mirror to form a bypass while the cross connection is formed by the light reflected between the acute prisms. Accordingly, the crossover optical interconnection integrated on a plane is defined by the bypass and the cross connection.

According to the present invention, therefore, the optical system of an alignment accuracy equal to or less than 1 $\mu$m can be embodied in small size and, thus, the optical crossover interconnection suitable for use in a switching network can be easily realized.

The above and other objects and advantages will be apparent from the following specification taken in conjunction with the accompanying drawings.

BRIEF DESCRIPTION OF THE DRAWINGS

FIG. 1 is a schematic view illustrating a planar integration of a free-space optical system, in which

BEST MODE FOR CARRYING OUT THE INVENTION

Figure 5:
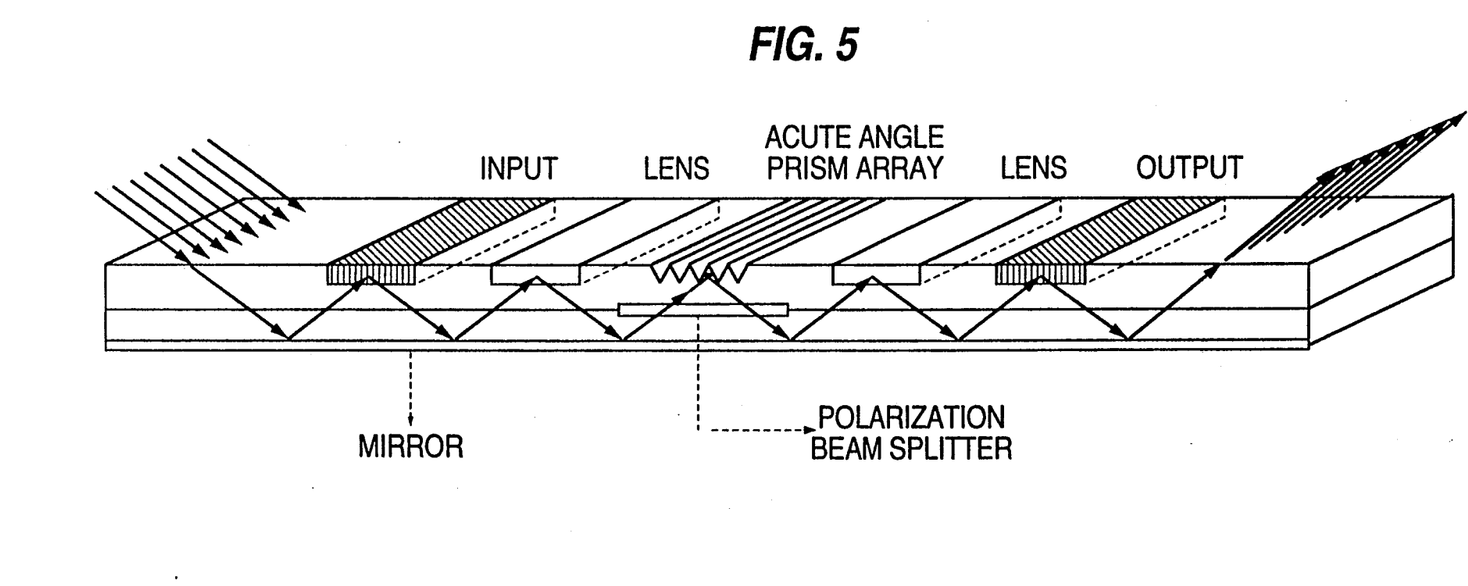
FIG. 5 is a view showing a planar integrated optical crossover system according to a preferred embodiment of the present invention.

Referring to FIG. 5, a planar integrated optical system of a crossover optical interconnect using an acute prism array proposed according to the present invention is illustrated.

As seen from FIG. 5, light input and output surfaces, lenses, a polarization beam splitter (PBS) and an acute angle prism array arranged on a optical substrate having a thickness of equal to or less than 10 mm, such as a glass substrate or a silicon substrate. In this construction, a light signal is propagated through the interior of the substrate as illustrated.

Figure 1B:
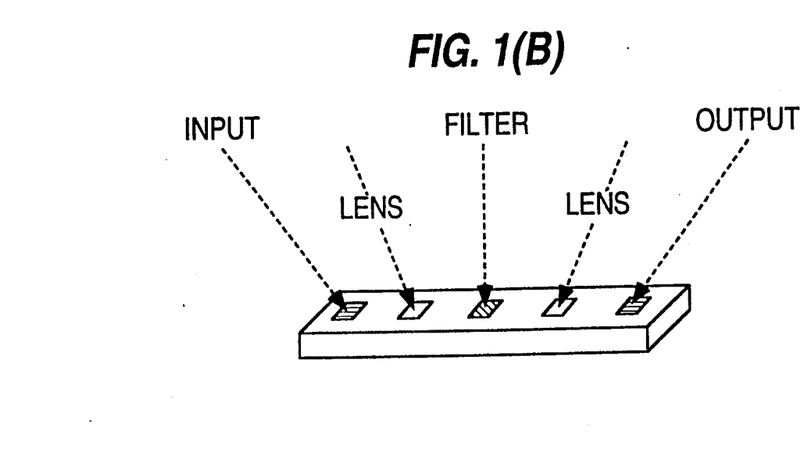

The light signal is divided into two light portions by the polarization beam splitter to form the crossover interconnection which bypassed the acute prism array. The optical parts, which have an alignment accuracy of equal to or less than 1 $\mu$m can be fabricated by way of a lithography and etching process and are maintained in a rigid state. The planar integration process for the optical system is well-known and is employed to integrate a free-space optical system of the type illustrated in FIG. 1(A) on a single substrate shown in FIG. 1 (B).

Figure 2:
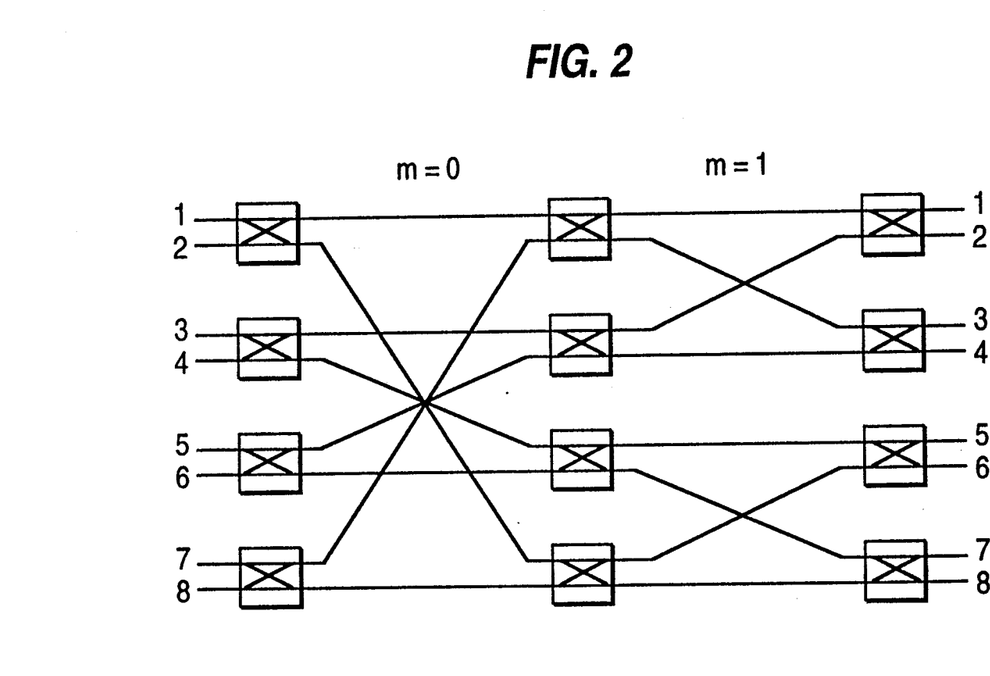
FIG. 2 is a schematic view showing a crossover interconnection having eight input and output channels.

The acute prism array including the prisms is used for each of switching steps to embody a crossover interconnection (an interconnection including eight input channels, two stages of switching steps or link steps, that is, m=(0,1) (see FIG. 2) by using the planar integration process. That is, one acute angle prism is employed in a first switching step (m=0) and two acute angle prisms are employed in a second switching step (m=1), as illustrated in FIG. 2.

Figure 4A:
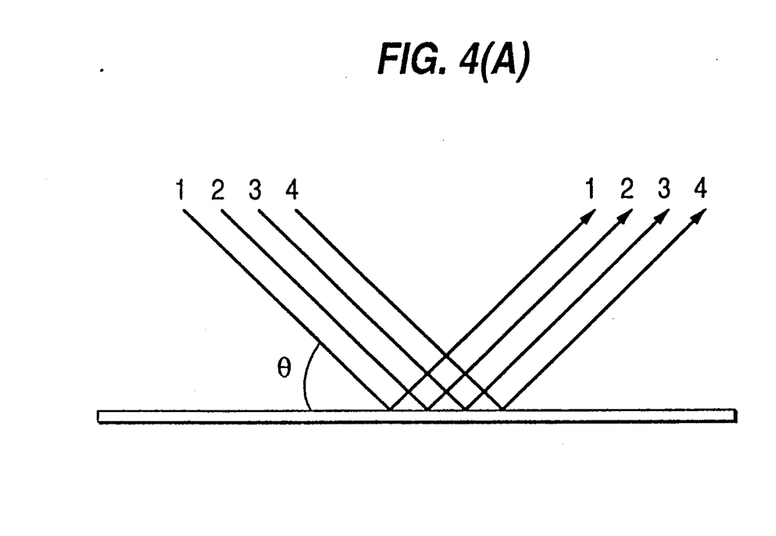
FIGS. 4A and 4B are respectively views illustrating a bypass and a cross connection in the crossover interconnection according to the present invention.
Figure 4B:
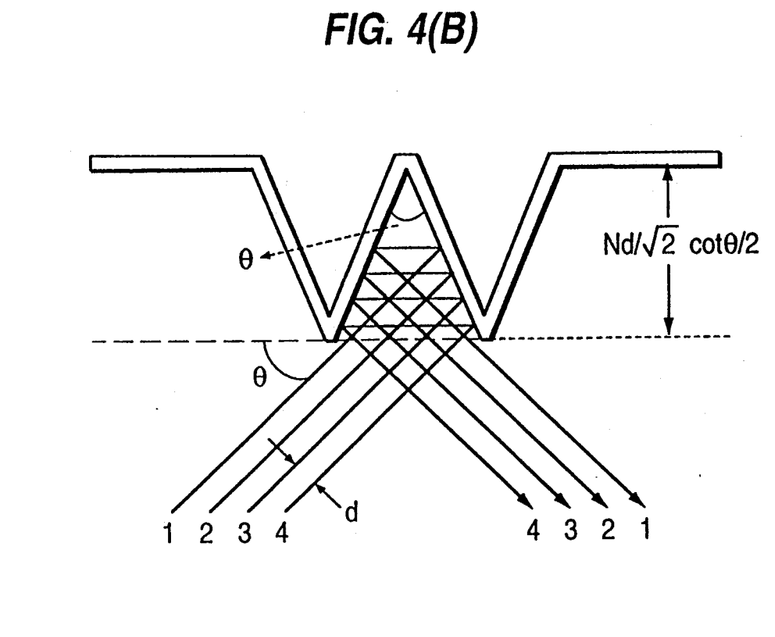

As seen from FIG. 4, in a bypass and crossconnection in the crossover interconnection, the bypass is achieved by a mirror while the cross connect is formed by the acute angle prism.

Vertical angles of all of the acute angle prisms will be equal to an angle defined between the light signal and the mirror surface while the light signal is propagated in the substrate in FIG. 5. More specifically, when a size (base side, depth) of the acute prism in the first switching stage is M, the dimension of the actue angle prism required for the respective switching steps becomes W/2 with W being a dimension of the base of a prism parallel to the light path direction through the silicon substrate.

The acute prism array, which has a dimension parallel to the light path direction from several hundred $\mu$m can be fabricated on a substrate such as a glass substrate, a silicon substrate or a GaAs substrate by an ion-beam etching method.

Particularly, in a case of a silicon substrate, the vertical angle of the acute angle prism, of FIG. 4 can be set to 70.52 degrees by way of an anisotropic etching process using a substrate having a silicon crystal orientation [100] in a vertical direction of the substrate. By applying the etching technique previously mentioned, all of the optical parts in FIG. 5 can be arranged on a single substrate.

As shown in FIG. 5, the light signal which is introduced into the planar integrated optical system comprising the acute angle prism array, the polarization beam splitter and surface relief lenses is propagated along the interior of the optical substrate and divided into two light portions by the beam splitter in accordance with the polarization state of the input signal. In other words, an S-polarization beam parallel to the surface of the polarization beam splitter is reflected by the beam splitter and transferred along a passage defined between the beam splitter and the mirror to thereby form the bypass of the crossover network. Alternatively, a p-polarization beam which is not parallel to the surface of the polarization beam splitter forms a cross connection by reflection caused by the acute angle prism array as illustrated in FIG. 4.

Figure 6:
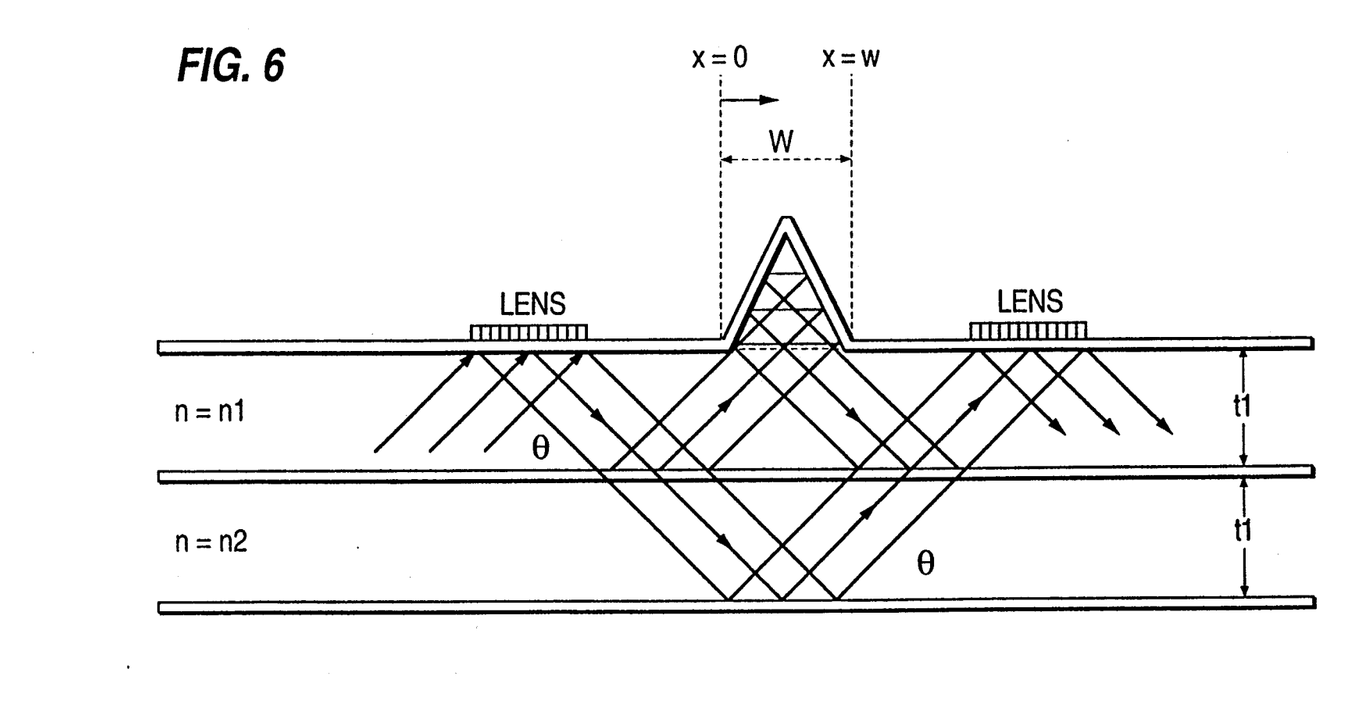
FIG. 6 is a view illustrating a light path difference in the crossover optical system; and, FIG. 7 is a view showing another embodiment of the present invention, in which the light signal path difference is minimized.

In FIG. 6, when the optical substrate parts on each side of the polarization beam splitter of FIG. 5 are made of the same medium, the thickness of one substrate part is equal to that of the other (that is, t1=t2).

Accordingly the light signal spectrum interconnected through the acute angle in a form of a cross connection is extended by a length of a passage defined in the acute angle prism. That is, the passage has a length longer than that between the beam splitter and the mirror. As a result of this light path difference, the bypassed signal and the cross-connection signal have different propagation time required for reaching the switching element array of the output which reduces the entire switching speed of the crossover interconnection. Further, the beam loss of the light signal cross-connection due to the light path difference is large as compared with that in case of the bypassed beam in the system, causing serious optical loss.

Figure 3A:
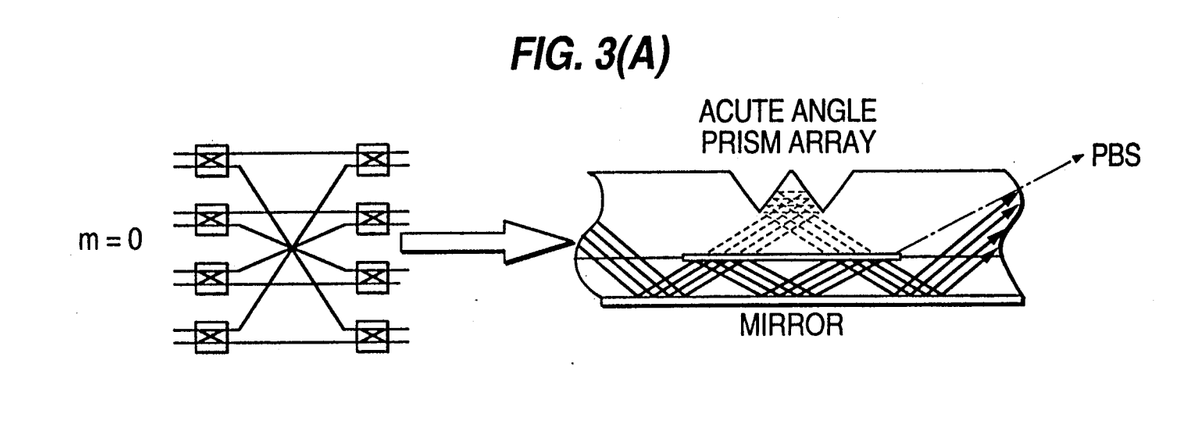
FIG. 3 is a view illustrating an acute angle prism array and explaining a principle of a crossover interconnection employing the acute angle prism array.
Figure 3B:
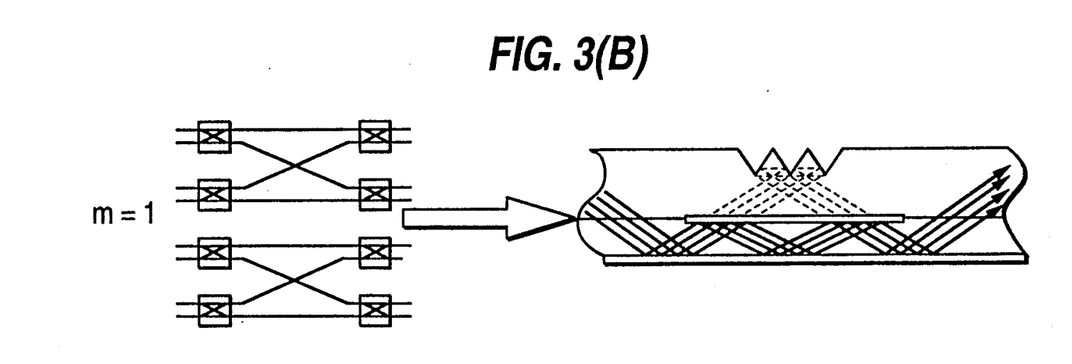

The most serious light path difference is presented at a link stage (i.e., m=0 As illustrated in FIG. 3) of first crossover interconnection having a single acute angle prism. A crossover network including N input channels and N output channels has a log $_2$N link stages and, at this time, the number of the acute angle prism required for m$_{th}$ link stage is given by $2^n$ (where, n=0.1, . . ., log $_2$N−1).

As shown in FIG. 6, when a width of the acute angle prism is W and a propagation angle of the light signal is $\theta$, the optical path difference (OPD) can be obtained by the following equation. That is, $$OPD = n_1\{W + 2(W-x)\cos\theta\} \quad (1)$$

where, n$_1$ is a refractive index of the optical substrate, X is a value as illustrated in FIG. 6 defined between O and W and denotes a position where the light signal is passed through an interface surface between the acute prism and the optical substrate.

As seen from the equation (1), the difference OPD is maximum when in X=O and is minimum when in X=W.

For example, the maximum difference OPD becomes 76.8 mm under a condition of n$_1$=1.5, $\theta$=60°, N=128 and a distance between in the channels is 200 mm.

Therefore, it is difficult to obtain the switching speed above 0.4 GHz from the respective switching channels.

Figure 7:
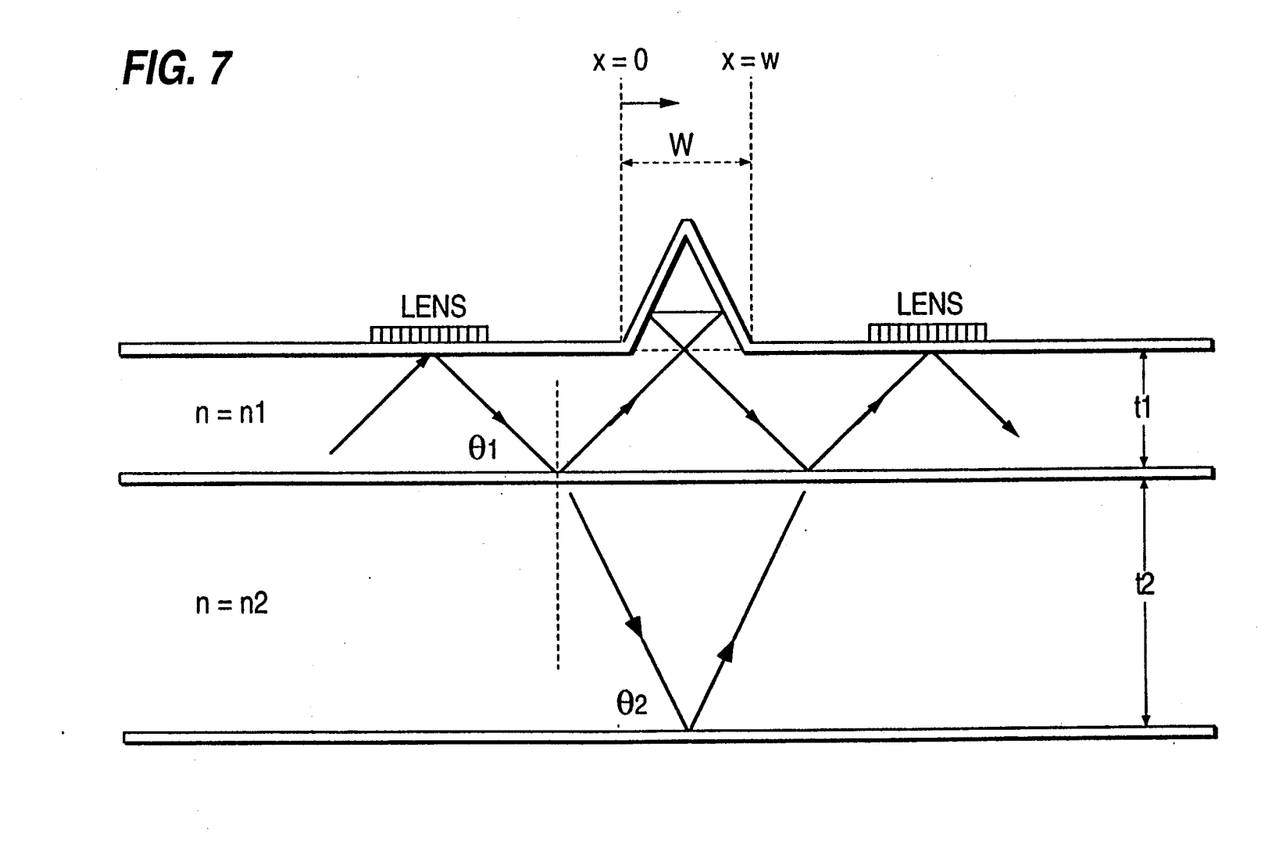

Referring to FIG. 7, a structure of the optical substrate capable of minimizing the light signal path difference is illustrated.

In accordance with the present invention, two optical substrates having different refractive indexes are employed to form the optical system.

The S-polarization beam of the input signal is incident on the acute prism with an angle of $\theta_1$ by means of the polarization beam splitter while the P-polarization beam of the input signal is propagated between the polarization beam splitter and the mirror with an angle of $\theta_2$ by way of snell's law (m$_1$ cos$\theta_1$ = n$_x$ cos$\theta_2$). Therefore, two optical substrates satisfactoring a condition of n$_2$) n$_1$ are used and, thus, the light path of bypass link propagated between the polarization beam splitter and the mirror is extended in such a way that the light path difference of the crossover connection signal on the acute angle prism can be compensated effectively.

An average value of the difference OPD given in the equation (1) becomes predetermined value for example, X=W/2 which depends upon the light path of the light signal incident on a center portion of bottom surface of the acute prism. Thus, the bypass link path defined between the polarization beam splitter and the mirror is extended in the same length as that of the average difference OPD, thereby minimizing the light path difference. The conditions to minimize the light path difference can be expressed as follows.

$$(n_2/n_1)^2 = 1 + [OPD/2n_1t_1]\sin\theta_1 \quad (2)$$

$$t_1 \tan\theta_2 = t_2 \tan\theta_1 \quad (3)$$

As described with respect to the example of FIG. 6, if the construction of FIG. 7 satisfactories the conditions (2) and (3), it is possible to obtain the switching speed of 2 GHz or more. In this case, the optical substrates may be embodied by a BK7 optical substrate (n$_1$=1.5) and SF1 optical substrate (n$_2$=1.76).

Further, the planar integrated optical system of FIG. 5 according to the present invention can be employed as a basic module to make the respective switching stages for the crossover switching network. Also, because the process of manufacturing and the size of the respective module are substantially similar to the existing electronic integrated device, the crossover light network made according to the present invention may be used together with the integrated device.

As stated above, the present invention can provide the following effect. First, while the conventional crossover optical network is employed with the free-space optical system, the crossover light network of the invention can be formed by way of the planar integrated optical technique with a result that the size of the optical system can be reduced to a size of the silicon wafer. Second, all of the optical parts are fabricated by way of a lithography which results in the system having a high alignment accuracy of equal to or less than 1 $\mu$m being achieved according to the present invention. Third, the present invention contemplates the optical network having a strong response to the light signal incident at the same angle as that of the vertical angle of the acute angle prism. Fourth, since the light signal is propagated in the substrate, noise effects caused by the external environment can be effectively reduced. Fifth, the planar integrated crossover optical network is similar to the existing electronic device in size. As a result, the optical system can be applied together with other electronic components within the existing electronic exchange system. The electronic connection network can be part of the planar integrated optical connection according to the present invention. Sixth, since the light signal is transferred through the interior of the substrate, a special waveguide is unnecessary. Further, the characteristic of the free-space optical network can be retained in the planar integrated crossover optical system of the present invention in such a way that the mutual interference of the light signals is prevented even when the light signals are crossed through each other. A high transfer rate and parallelism of the light signal is achieved which improves the efficiency of the exchange circuit. Seventh, since the crossover connection can be constructed without employing a special waveguide or transfer path, it is possible to provide the simplified, economic construction of the optical system.

Finally, when two optical substrates having different refractive index are employed the light path difference between the bypass and the cross connect in the crossover network is minimized. As a result, light loss can be reduced and the switching rate in the respective switching channels can be increased by five times as compared with the optical substrates having the same index.

What is claimed is:

1. A planar integrated optical apparatus for implementation of a crossover interconnection network comprising:
    a first optical substrate having a first surface in which a plurality of optical components of the crossover interconnection network are integrated and disposed in series;
    a second optical substrate having two surfaces, on one of the surfaces is formed a reflecting mirror layer and on the other of the surfaces is formed a second surface of the first optical substrate opposed to the first surface of the first optical substrate;
    an acute-angle prism array formed on the first surface of the first optical substrate having at least one acute-angle prism disposed between two of the optical components; and
    a polarization beam splitter formed between the first and second optical substrates and below the acute-angle prism array, wherein each of a plurality of incident beams in the optical substrates are split into two optical signals by the polarization beam splitter, one of the optical signals being reflected from the polarization beam splitter and bypassed to an output of the optical components without optical coupling to the acute angle prism array, and the other of the two optical signals being passed through the polarization beam splitter and optically coupled to the acute-angle prism array and being outputted by the acute-angle prism array to the output.

2. The apparatus according to claim 1 wherein:
    each acute-angle prism of the acute-angle prism array is formed with an apex angle of 70.52 degrees.

3. The apparatus according to claim 1 wherein:
    the polarization beam splitter extends beyond the acute-angle prism array in a longitudinal direction of the apparatus.

4. The apparatus according to claim 1 wherein:
    the optical signal reflected from the polarization beam splitter is an S-polarization beam which is parallel to a surface of the polarization beam splitter and the optical signal passed through the polarization beam splitter is a P-polarization beam which is not parallel to the surface of the polarization beam splitter.

5. The apparatus according to claim 1 wherein:
    each of the optical substrates is formed of one of glass, silicon or GaAs.

6. The apparatus according to claim 1 wherein:
    each of said optical substrates is formed of a silicon substrate in which a crystal orientation thereof is [100].

7. The apparatus according to claim 6 wherein:
    an index of refraction of the first optical substrate is different from an index of refraction of the second optical substrate, and the indexes of refraction satisfy a relationship given by $(n_2/n_1)^2 = 1 + [OPD/2n_1 t_1] \sin \theta_1$ and $t_1 \tan \theta_2 = t_2 \tan \theta_1$, where $t_1$ and $t_2$ are respective thicknesses of the optical substrates, $n_1$ and $n_2$ are respective indexes of refraction of the optical substrates, and $\theta_1$ and $\theta_2$ are respectively propagation angles between the reflected optical signal and a surface of the polarization beam splitter and between the passed optical signal and the second optical substrate.

* * * * *